Figure 1:
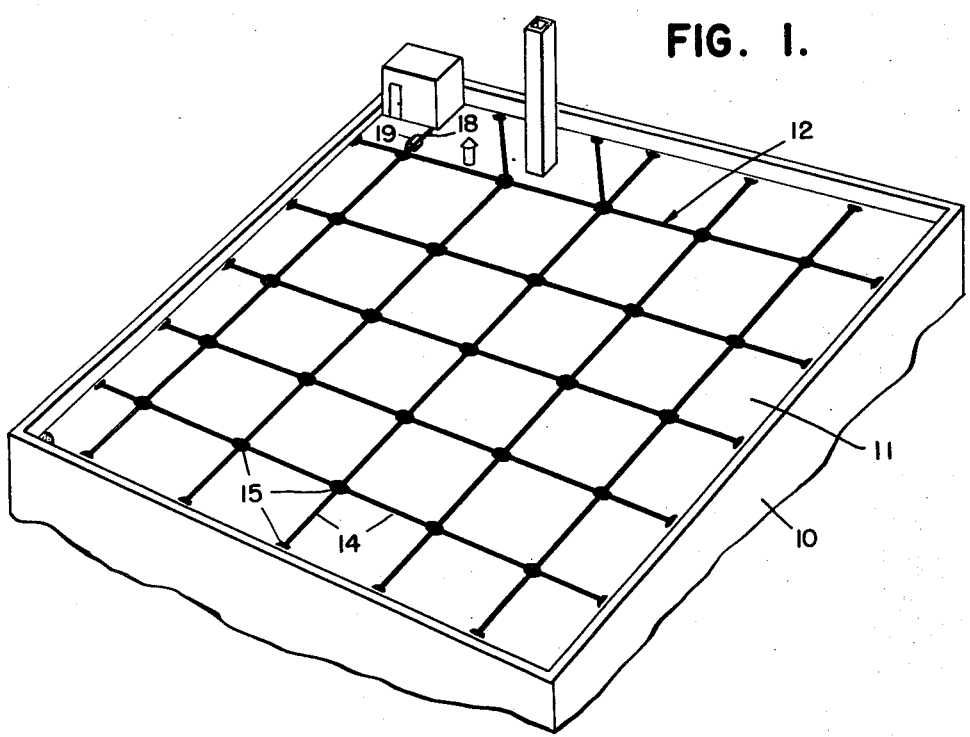

May 9, 1950      A. T. MURRAY      2,506,936
ROOF COOLING SYSTEM
Filed April 29, 1947

INVENTOR
ALFRED T. MURRAY
BY
*Mason & Graham*
ATTORNEYS

Patented May 9, 1950

2,506,936

UNITED STATES PATENT OFFICE 2,506,936

ROOF COOLING SYSTEM

Alfred T. Murray, Pasadena, Calif.

Application April 29, 1947, Serial No. 744,703

12 Claims. (Cl. 62—2)

This invention relates particularly to the art of cooling buildings by applying water to the exposed roof surface periodically and utilizing the natural cooling effect resulting from the evaporation of the water. While the invention will be described with reference to the cooling of buildings, it will be understood that it can also be used to cool or prevent overheating of other surfaces and structures, such as oil or gasoline tanks in tank farms, for example.

I am aware that heretofore buildings have been cooled by spraying water on or otherwise applying it to the roof surface periodically. One system for doing this with which I am familiar includes a water distribution system and an associated thermostat means for controlling the supply of water to the system in such a manner that when the temperature of the thermostat reaches a predetermined point water is supplied to the system and continues to be supplied until the temperature of the thermostat drops a given amount. The disadvantage of this system lies in the fact that an excess of water is supplied to the roof surface. In this connection, it is obvious that the rate of evaporation of the water from the roof surface determines the degree of cooling or refrigeration effect achieved. If only a small amount of water is placed on the roof, the evaporation is highly accelerated as compared to what it would be if the roof surface were flooded with water.

One reason for the excess water supplied with systems now in use is the fact that a thermostat is used not only to start the supply of water but also to shut off the same. It has been found that the thermostats do not operate successfully over a very limited degree of fluctuation in temperature, requiring usually at least a three to four degree differential between the make and break, or, in connection with the water distribution system, a three to four degree differential between the temperature at which the water is turned on and that at which it is turned off.

An attempt has been made to overcome supplying excess water by utilizing spray heads or outlets of extremely limited capacity so that only a very small amount of water is delivered. However, this method has the further disadvantage that the small outlet orifices become clogged either by deposits from mineralized water or from foreign particles in the water, thus rendering the system dependent upon frequent repairs.

It is an object of this invention to provide an economical method and apparatus for efficiently cooling exposed surfaces, such as roofs, by the application of water in response to temperature conditions in a manner to achieve maximum evaporative cooling effect from the water.

It is also an object of this invention to provide a new and improved apparatus for automatically supplying water to a water distribution system, such as one used for cooling the roofs of buildings, in response to temperature conditions and for automatically, positively shutting off the supply of water after a predetermined interval of time, or after a predetermined amount of water has been supplied. The apparatus thus enables the correct amount of water to be applied at the right time in a very limited period of time with the result that relatively large outlet orifices may be employed in the system and yet the roof not become flooded.

It is also an object of the invention to provide apparatus of the type indicated which will operate in response to temperature conditions to supply water to a distribution system for a limited period of time but which will also operate to prevent the immediate resupply of water to the distribution system in response to temperature conditions until a predetermined minimum amount of time has elapsed after each supply period.

It is a further object to provide means for lowering the temperature of the temperature responsive portion of the apparatus at the time water is supplied to the system and thereby provide a means of preventing the immediate reactivation of the system after a predetermined amount of water has been supplied.

Figure 2:
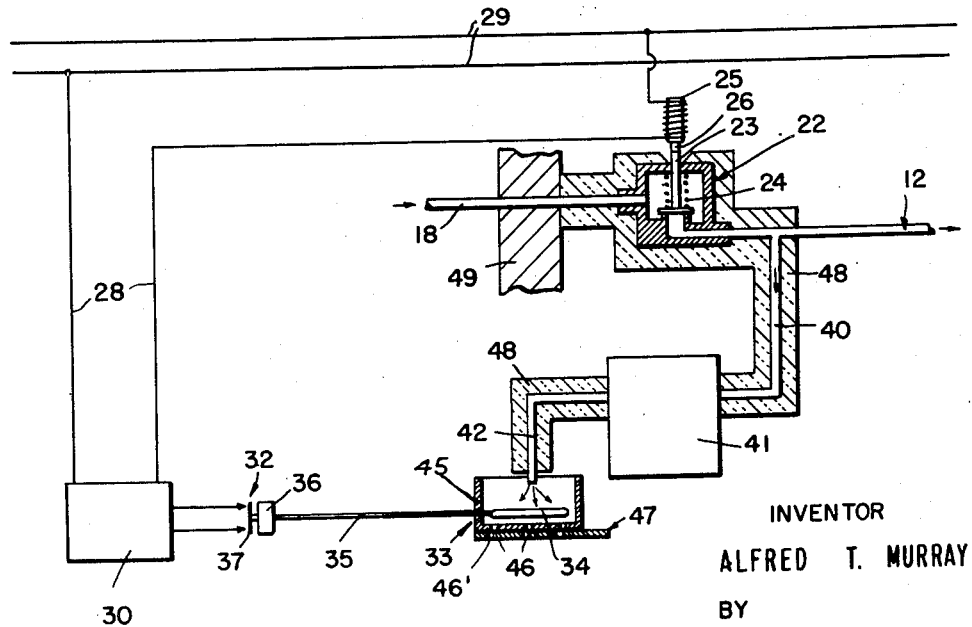

These and other objects will be apparent from the drawing and the following description. Referring to the drawing, which is merely for illustrative purposes:

Fig. 1 is a schematic representation of the roof of a building and the water supply and distribution system including the control means therefor; and Fig. 2 is a schematic view of the control means.

More particularly describing the invention, reference numeral 10 generally indicates the upper part of a building and 11 the roof thereof. Extending over the roof is a water distribution system 12 comprising a plurality of individual and connected pipes 14 provided with suitable outlets 15, such as ordinary sprinkler heads. Reference numeral 18 generally indicates a supply pipe which may be considered as leading to a source of water under pressure. The control means of the invention has been indicated schematically at 19 in Fig. 1 and is shown in detail in Fig. 2.

As heretofore indicated, it is desirable to automatically supply water to the water distribution system when the temperature of the atmosphere on the roof of the building or at some given point reaches a predetermined height, and to supply only a limited quantity of water so that the roof surface will be wet but not flooded. By only supplying a limited quantity of water to the roof at periodic intervals when the temperature is elevated, it is possible to obtain maximum evaporation of the water and thereby achieve maximum cooling effect. One method of accomplishing this may be briefly described as comprising the application of water to the surface for a predetermined length of time when the temperature is at a given height; thereby applying what is substantially a predetermined amount of water. Water is then withheld from the surface for a predetermined period of time, thereby permitting complete evaporation and a return of the surface to the given high temperature. After the withholding period and when the temperature is again at the given height, water is again applied and the steps are repeated dependent upon temperature conditions. The period of time of application of the water will depend upon several factors, such as water pressure, capacity of distribution system, and the like, and will vary from one installation to another. Likewise, the withholding period may be varied to meet the conditions at the particular installation. The determination of the temperature at which the water is to be supplied will be a matter of choice at the site.

Referring to Fig. 2 for a description of the control means of the apparatus, reference numeral 22 indicates a control valve which is located in the supply pipe 18 and may be of any suitable construction such that the valve is normally closed but may be readily opened as occasion demands. In the representation of the valve shown, a valve member 23 is shown yieldably urged to a closed position by the spring 24. The valve is opened by an electromagnetic means such as a solenoid 25, the plunger 26 of which is connected to the valve.

The solenoid is included in a circuit 28 which is connected to power lines 29 leading to a source of electromotive force. The circuit 28 includes a timer or timed relay 30 which, except when actuated, serves to maintain circuit 28 open. The timer is actuated by the closing of switch 32 which, in turn, is operated by a thermostat generally indicated by 33. The timer, when actuated, is designed to close and maintain the circuit 28 closed for a predetermined length of time such as may be desirable. The timer should be adjustable in this respect in order to vary the length of the period as required by the various factors present in a particular installation in order that the timer may be set to cause the system to deliver only the required amount of water each time the timer is actuated. It is contemplated that any suitable standard automatic reset type electrical timer may be used and hence the details of such a device are not shown.

The temperature responsive device or thermostat 33, used for closing the timer actuating switch 32, may be of a standard type and is shown as comprising the bulb 34, tube 35, and diaphragm element 36 filled with a suitable expansible fluid. The diaphragm operates the switch contact 37. When the temperature of the thermostat reaches a predetermined height, the thermostat is effective to close the switch 32 and thereby actuate the timer, which in turn closes circuit 28, energizing solenoid 25, which opens the valve 22, permitting water to be supplied to the water distribution system. The water will then continue to be supplied to the distribution system for the predetermined length of time, depending upon the setting of the timer 30 which, when once actuated, will keep the circuit 28 closed for such length of time regardless of the subsequent position of the switch 32.

It is desirable to provide means for preventing the reactuation of the timer 30 successively and one means of accomplishing this is to provide means for lowering the temperature of the thermostat 33 so that switch 32 will necessarily be opened almost immediately when water is supplied to the distribution system. This may be done by providing a branch conduit or pipe 40 leading to a water cooler 41 and from the cooler an outlet pipe 42 which delivers the water to the bulb 34 of the thermostat. Preferably the bulb is enclosed within a suitable housing 45 having limited apertures 46 to prevent rapid escape of the water from the housing. The apertures 46 may be made adjustable as by means of a slidable plate 47 having holes 46′ corresponding to apertures 46.

In order to insure a supply of relatively cool water reaching the bulb 34, the supply pipe 18, the valve 22, branch pipe 40 and outlet pipe 42 are encased in suitable insulation 48 where these parts are exposed to weather conditions, as for example, where they are exteriorly of the building wall, which is indicated at 49. Any type of cooler may be used but at 41 there is shown a container having a foraminous wall through which the water gradually seeps and evaporates from the outer surface to maintain the interior of the vessel cool.

An additional control may be provided by so adjusting the apertures 46 in the housing 45 to the amount of water delivered so as to retain water within the housing for a predetermined length of time and thereby, during such time, prevent the thermostat from rising to a height level where it would again actuate the timer.

It is also contemplated that in place of the timer 30 which has been described, a timer may be used which, when actuated, will serve to close circuit 28 and retain the same closed for a predetermined length of time and then, regardless of the position of the actuating switch 32, will maintain the circuit open for a predetermined length of time. With such a timer the means for artificially cooling the thermostat need not be used unless it is desired to have this additional control element.

It will be apparent that the invention is broadly concerned with the application of a predetermined amount of water to a surface in response to temperature conditions in order to obtain maximum cooling. Another method of accomplishing this is to meter or measure the quantity of water flowing to the distribution system and to stop the flow after a given desired amount has passed the measuring point in the line. Thus, by this method water is supplied when the temperature reaches a given height, the amount of water is measured, as by a flow meter, and when a given amount has been delivered, the supply is shut off, as by a control valve. When the temperature again reaches the predetermined height, water is again supplied and the cycle repeated.

While the invention has been described with particularity above, it is contemplated that various changes and modifications can be made without departing from the scope of the invention as set forth in the claims.

I claim:

1. The method of cooling an exposed surface which comprises the steps of applying water to the surface for a predetermined length of time when the temperature at a given point reaches a predetermined height, withholding water from said surface for a predetermined length of time after said application of water irrespective of temperature conditions, again applying water to the surface after said withholding period when the temperature reaches said predetermined height, and repeating said steps of applying, withholding and applying water to the surface.

2. Control means for a water distribution system including a supply pipe and a plurality of distribution pipes having water outlets, comprising a valve in said supply line, valve operating means associated with said valve, control means for said valve operating means constructed and arranged to actuate said valve operating means in a manner to hold said valve open for a predetermined length of time and immediately thereafter to hold said valve closed for a predetermined length of time, and thermostat means for initially actuating said control means.

3. Control means for a water distribution system including a supply pipe and a plurality of distribution pipes having outlets connected thereto, comprising a normally closed valve in said supply pipe, an electrical circuit including valve operating means and a timer element adapted to change the electrical characteristics of said circuit in a manner to cause said valve operating means to open said valve for a predetermined length of time and thereafter to maintain said valve closed for a predetermined length of time when actuated, and a thermostat for actuating said timer.

4. Control means for a water distribution system including a supply pipe and a plurality of distribution pipes having outlets connected thereto comprising a normally closed valve in said supply pipe, an electrical circuit including a solenoid adapted to open said valve when energized and a timer element adapted to close the circuit for a given period of time and to subsequently open said circuit for a given period of time when actuated, and a thermostat for actuating said timer element.

5. Control means for a water distribution system including a supply pipe and a plurality of distribution pipes having outlets connected thereto comprising a normally closed valve in said supply pipe, an electrical circuit including a solenoid adapted to open said valve when energized and a timer element adapted to close the circuit for a given period of time and to subsequently open said circuit for a given period of time when actuated, and a thermostat for actuating said timer element, and means for cooling said thermostat when said valve is opened.

6. Control means for a water distribution system including a supply pipe and a plurality of distribution pipes having outlets connected thereto comprising a normally closed valve in said supply pipe, an electrical circuit including a solenoid adapted to open said valve when energized and a timer element adapted to close the circuit for a given period of time when actuated, and a thermostat for actuating said timer element, and means for cooling said thermostat when said valve is opened.

7. Control means for a water distribution system including a supply pipe and a plurality of distribution pipes having outlets connected thereto, comprising a normally closed valve in said supply pipe, valve operating means associated with said valve, timing means for causing said valve operating means to open said valve and hold the same open for a given period of time, a thermostat for actuating said timing means, and means for cooling said thermostat when said valve is open.

8. Control means for a water distribution system including a supply pipe and a plurality of distribution pipes having outlets connected thereto, comprising a normally closed valve in said supply pipe, valve operating means associated with said valve, timing means for causing said valve operating means to open said valve and hold the same open for a given period of time, a thermostat for actuating said timing means, and means for cooling said thermostat when said valve is open, said last mentioned means comprising a water supply conduit leading from the outlet side of said valve to said thermostat.

9. In a system of the type described having a water supply pipe, distribution pipes, a valve in said supply pipe, and means for opening said valve, means for controlling said last mentioned means comprising a thermostat, and a water delivery pipe leading from the outlet side of said valve to said thermostat.

10. In a system of the type described having a water supply pipe, distribution pipes, a valve in said supply pipe, and means for opening said valve, means for controlling said last mentioned means comprising a thermostat, and a water delivery pipe leading from the outlet side of said valve to said thermostat, and water cooling means intermediate the ends of said water delivery pipe.

11. In a system of the type described having a water supply pipe, distribution pipes, a valve in said supply pipe, and means for opening said valve, means for controlling said last mentioned means comprising a thermostat, a housing partially enclosing said thermostat, said housing being apertured to permit of escape of water therefrom at a limited rate, and a pipe leading from the outlet side of said valve to said housing.

12. The method of cooling an exposed surface which comprises the steps of applying a measured given quantity of water to the surface when the temperature at a given point reaches a predetermined height, withholding water from said surface for a predetermined length of time after said application of water irrespective of temperature conditions, again applying water to said surface after said withholding period when the temperature is at or above said predetermined height, and repeating said steps of applying, witholding and applying water to the surface.

ALFRED T. MURRAY.

REFERENCES CITED

The following references are of record in the file of this patent:

UNITED STATES PATENTS

| Number | Name | Date |
| --- | --- | --- |
| 2,266,321 | Holder | Dec. 16, 1941 |
| 2,437,156 | Frick | Mar. 2, 1948 |